(12) United States Patent
Wombacher et al.

(10) Patent No.: US 8,246,741 B2
(45) Date of Patent: Aug. 21, 2012

(54) COMPOSITION AND ITS USE FOR IMPROVING THE PROCESSIBILITY OF HYDRAULICALLY SETTING COMPOSITIONS

(75) Inventors: Franz Wombacher, Jonen (CH); Urs Maeder, Frauenfeld (CH)

(73) Assignee: Sika Technology AG, Baar (CH)

( * ) Notice: Subject to any disclaimer, the term of this patent is extended or adjusted under 35 U.S.C. 154(b) by 901 days.

(21) Appl. No.: 12/086,122

(22) PCT Filed: Dec. 8, 2006

(86) PCT No.: PCT/EP2006/069495
§ 371 (c)(1),
(2), (4) Date: Dec. 3, 2008

(87) PCT Pub. No.: WO2007/065952
PCT Pub. Date: Jun. 14, 2007

(65) Prior Publication Data
US 2009/0241804 A1    Oct. 1, 2009

(30) Foreign Application Priority Data
Dec. 8, 2005  (EP) ..................................... 05111850

(51) Int. Cl.
*C04B 24/12*    (2006.01)

(52) U.S. Cl. ............ 106/724; 106/727; 106/823; 524/2; 524/5

(58) Field of Classification Search .................. 106/724, 106/727, 823; 524/2, 5
See application file for complete search history.

(56) References Cited

U.S. PATENT DOCUMENTS
5,556,460 A    9/1996  Berke et al.

FOREIGN PATENT DOCUMENTS

| | | |
|---|---|---|
| EP | 1 136 507 A1 | 9/2001 |
| EP | 1 149 808 A2 | 10/2001 |
| EP | 1 138 697 B1 | 11/2003 |
| EP | 1 061 089 B1 | 3/2004 |
| JP | A-2002-3256 | 1/2002 |
| JP | A-2002-12461 | 1/2002 |

OTHER PUBLICATIONS

Jul. 12, 2011 Notice of Reasons for Rejection issued in Japanese Application No. 2008-543849 with English-language translation.

*Primary Examiner* — Paul Marcantoni
(74) *Attorney, Agent, or Firm* — Oliff & Berridge, PLC

(57) ABSTRACT

The invention relates to a composition comprising at least one plasticizer for a hydraulically setting composition and at least one polyalkylene glycol. The invention also relates to a process that uses the composition for improving the processibility, in particular for extending the processing time, of hydraulically setting compositions.

19 Claims, No Drawings

COMPOSITION AND ITS USE FOR IMPROVING THE PROCESSIBILITY OF HYDRAULICALLY SETTING COMPOSITIONS

FIELD OF THE INVENTION

The invention relates to the field of concrete technology. The invention relates to a composition comprising at least one plasticizer for a hydraulically setting composition and at least one polyalkylene glycol, and its use for improving the processability, preferably for extending the processing time, of hydraulically setting compositions.

PRIOR ART

The production of concrete is a very complex process. Concrete is produced from cement, from concrete aggregates, such as, for example, gravel or sand, and from water. Cement is known to be very sensitive to water, regardless of whether it is present in the liquid or gaseous state, since cement sets hydraulically, i.e. it hardens under the influence of water within a short time to give a very stable solid.

In the further processing to concrete, the material cement is mixed with aggregates and chemical admixtures. For example, the cement is mixed together with water, rock and further additives in a stirrer. By the addition of the liquid or pulverulent admixtures, it is intended to improve the properties of the concrete from the chemical and/or physical point of view. Thus, the admixtures may influence, for example, the flow property, the viscosity, the compaction behavior and the setting behavior of the concrete.

The use of so-called concrete plasticizers has long been known. For example, EP 1 138 697 B1 or EP 1 061 089 B1 discloses that (meth)acrylate polymers having ester and optionally amide side chains are suitable as concrete plasticizers. Here, this concrete plasticizer is added to the cement as an admixture or added to the cement before grinding, and leads to greater plasticization, or reduction in the water requirement, of the concrete or mortar produced therefrom.

U.S. Pat. No. 5,556,460 describes a cement admixture for use as a shrinkage reducer, the admixture comprising at least one oxyalkylene glycol and at least one comb polymer, the proportion by weight of the oxyalkylene glycol being at least 50%.

EP 1 149 808 A2 describes a cement admixture for use as a plasticizer, the admixture comprising a polyalkylene glycol A and a copolymer B, the weight ratio of A/B being from 0.02 to 0.3 and the average molecular weight X of the polyalkylene glycol A and the average molecular weight Y of a polyalkylene glycol side chain unit of the copolymer B satisfying the equation 0.9<(X/Y)<1.1. Only in these ranges does the admixture have a satisfactory flow behavior and satisfactory shrinkage reduction.

At high temperatures or during transport of concrete, there is the danger that the concrete will harden too rapidly and will no longer be suitable for processing. In order to extend the processability, i.e. the processing time of the concrete, retardants are used. However, the known retardants have the disadvantage that they simultaneously also delay the time to the beginning of setting. This is disadvantageous particularly when rapid solidification is desired after processing.

SUMMARY OF THE INVENTION

An object of the present invention is therefore to provide a composition and the use for such a composition for extending the processing time of hydraulically setting compositions, which overcomes the disadvantages of the prior art and which does not extend the setting times. This object is achieved by a composition and a use as claimed in the independent claims.

Surprisingly, it was found that a composition as claimed in claim 1 containing at least one substituted or unsubstituted polyalkylene glycol according to formula (I) and at least one plasticizer for a hydraulically setting composition containing at least one polymer A according to formula (II) is outstandingly suitable for extending the processing time of hydraulically setting compositions and improving the flow behavior. In particular, it was surprisingly found that, by the combination of the polymers A according to formula (II) with at least one polyalkylene glycol according to formula (I), the disadvantages of the known retardants can be eliminated and the setting time is not extended, and that additionally the advantageous effects of the polymer A are further improved. The composition according to the invention can therefore be used instead of a conventional retardant and thus simultaneously acts as a plasticizer and as a composition for extending the processing time.

DESCRIPTION OF THE PREFERRED EMBODIMENTS

The present invention relates to a composition and its use for extending the processing time. The composition according to the invention comprises or consists of at least one substituted or unsubstituted polyalkylene glycol of the formula (I) and at least one plasticizer for a hydraulically setting composition comprising or consisting of at least one polymer A of the formula (II).

The formula (I) of the substituted or unsubstituted polyalkylene glycol is:

$$R^{11}\!-\!O\!-\!(R^{12}\!-\!O)_x\!-\!(R^{13}\!-\!O)_y\!-\!R^{14} \qquad (I)$$

in which
$R^{11}$ is H or C1- to C20-alkyl,
$R^{12}$ is C2- to C4-alkylene,
$R^{13}$ is C2- to C4-alkylene,
$R^{14}$ is H or C1- to C20-alkyl,
x is 0-500 and
y is 0-500,
x+y being >20 and the molecular weight $M_w$ of the polyalkylene glycol of the formula (I) being from 2000 to 20 000 g/mol.

In a preferred embodiment, $R^{12}=R^{13}$.

In a further preferred embodiment, $R^{11}$ and $R^{14}$, independently of one another, are H or a methyl or butyl, preferably an H, $R^{12}$ and $R^{13}$ are ethylene or propylene, preferably ethylene, preferably $R^{12}=R^{13}$. $R^{12}$ and $R^{13}$ may also be different from one another and may be present as block copolymers or randomly arranged.

In a particularly preferred embodiment, the polyalkylene glycol of the formula (I) is a polyethylene glycol (PEG), methoxypolyethylene glycol (MPEG) or a polypropylene glycol (PPG). Polyethylene glycol (PEG) or methoxypolyethylene glycol (MPEG) is particularly preferred.

Mixtures of two or more polyalkylene glycols of the formula (I) are also suitable, in particular mixtures of polyethylene glycol (PEG) and methoxypolyethylene glycol (MPEG), or mixtures of polyethylene glycols (PEGs) having different molecular weights $M_w$ or mixtures of methoxypolyethylene glycols (MPEGs) having different molecular weights $M_w$.

Typically, the molecular weight $M_w$ of the polyalkylene glycol is from 2000 to 20 000 g/mol, preferably from 3000 to 10 000 g/mol, particularly preferably from 4000 to 6000 g/mol. Polyalkylene glycol having a molecular weight from 4000 to 6000 g/mol is particularly preferred, in particular polyethylene glycol (PEG) or methoxypolyethylene glycol (MPEG) having a molecular weight of from 4000 to 6000 g/mol. Particularly good results are obtained with a polyalkylene glycol having a molecular weight of from 5000 to 6000 g/mol. The values for x+y are preferably from 40 to 150, even more preferably from 50 to 100.

In the context of the invention, "molecular weight" is understood as meaning the weight average molecular weight $M_w$.

Suitable plasticizers are those which are suitable for plasticizing a hydraulically setting composition or reducing the water requirement thereof. In the context of the invention, "plasticizer" is also understood as meaning a super plasticizer, which is often also designated as a flow agent.

The plasticizer of the present invention contains or consists of at least one polycarboxylate ether (PCE). Preferably, the plasticizer contains or consists of at least one polymer A of the formula (II).

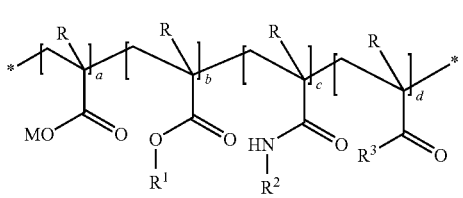

(II)

Here, M, independently of one another, are $H^+$, alkali metal ion, alkaline earth metal ion, divalent or trivalent metal ion, ammonium ion or organic ammonium group. Here and below, the term "independently of one another" means in each case that a substituent can have different available meanings in the same molecule. Thus, for example, in the polymer A of the formula (II) can simultaneously have carboxyl groups and sodium carboxylate groups, i.e. for $R_1$ in this case $H^+$ and $Na^+$ mean independently of one another.

It is clear to the person skilled in the art that it is firstly a carboxylate to which the ion M is bonded and that secondly, in the case of polyvalent ions M, the charge must be compensated by counterions.

Furthermore the substituents R, independently of one another, are hydrogen or methyl. This means that polymer A is a substituted poly(acrylate), poly(methacrylate) or a poly((meth)acrylate).

Furthermore, the substituents $R^1$ and $R^2$, independently of one another, are $C_1$- to $C_{20}$-alkyl, cycloalkyl, alkylaryl or -$[AO]_n$—$R^4$. Here, A is a $C_2$- to $C_4$-alkylene group and $R^4$ is a $C_1$- to $C_{20}$-alkyl, cyclohexyl or alkylaryl group, while n has a value of from 2 to 250, in particular from 8 to 200, particularly preferably from 11 to 150, more preferably from 15 to 80. Preferably, the substituents $R^1$ and $R^2$, in particular substituent $R^1$, are the radical -$[AO]_n$—$R^4$, i.e. a polyalkylene glycol radical, A being a $C_2$- and/or $C_3$-alkylene group and AO thus being an ethylene oxide (EO) and/or propylene oxide (PO) unit. The sequence of the ethylene oxide (EO), propylene oxide (PO) and any butylene oxide (BuO) units in polymer A may be distributed blockwise and/or randomly. The value for n is preferably chosen so that the molecular weight for $R^1$ and $R^2$ is not substantially higher than 3000 g/mol, preferably $M_w$ is from 1000 to 3000 g/mol. Thus, n preferably has the value 15 to 80, more preferably 20 to 70.

The substituent $R^3$ is furthermore —$NH_2$, —$NR^5R^6$, or —$OR^7NR^8R^9$. Here, $R^5$ and $R^6$, independently of one another, are H or a $C_1$- to $C_{20}$-alkyl, cycloalkyl or alkylaryl or aryl group or a hydroxyalkyl group or an acetoxyethyl ($CH_3$—CO—O—$CH_2$—$CH_2$—) or a hydroxyisopropyl (HO—$CH(CH_3)$—$CH_2$—) or an acetoxyisopropyl group ($CH_3$—CO—O—$CH(CH_3)$—$CH_2$—) or $R^5$ and $R^6$ together form a ring, of which the nitrogen of the —$NR^5R^6$ is part, in order to build up the morpholine or imidazoline ring. Here, furthermore, the substituents $R^8$ and $R^9$, independently of one another, are a $C_1$- to $C_{20}$-alkyl, cycloalkyl, alkylaryl, aryl or a hydroxyalkyl group and $R^7$ is a linear or branched $C_2$-$C_4$-alkylene group, in particular isomers of the $C_2$-$C_4$-alkylenes, preferably an ethylene, propylene, isopropylene or —$C(CH_3)_2$—$CH_2$—.

Finally, the indices a, b, c and d are molar ratios of these structural elements in the polymer A of the formula (II). These structural elements have the following ratio to one another a/b/c/d=(0.05-0.9)/(0.05-0.9)/(0-0.8)/(0-0.5), in particular a/b/c/d=(0.1-0.9)/(0.1-0.9) (0-0.5)/(0-0.1), preferably a/b/c/d=(0.1-0.9)/(0.1-0.9) (0-0.3)/(0-0.06), while the sum a+b+c+d is 1. The sum c+d is preferably greater than 0, preferably from 0.0001 to 0.8, more preferably from 0.0001 to 0.1, most preferably from 0.001 to 0.02.

Typically, the proportion of the polymer A of the formula (II) is from 10 to 100% by weight, in particular from 25 to 50% by weight, based on the total weight of the plasticizer. The remainder may be, for example, a solvent, in particular water, and further additives.

The preparation of the polymer A can be effected by free radical polymerization of the respective monomers

(III$_a$)

(III$_b$)

(III$_c$)

(III$_d$)

or by a so-called polymer-analogous reaction of a polycarboxylic acid of the formula (IV)

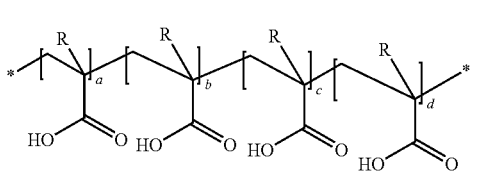

In the polymer-analogous reaction, the polycarboxylic acid is esterified or amidated with the corresponding alcohols or amines. Details of the polymer-analogous reaction are disclosed, for example, in EP 1 138 697 B1 on page 7, line 20 to page 8, line 50, and in the examples thereof or in EP 1 061 089 B1 on page 4, line 54 to page 5, line 38 and in the examples thereof. In one variant thereof, as described in EP 1 348 729 A1 on page 3 to page 5 and in the examples thereof, the polymer A can be prepared in the solid state of aggregation.

It has been found that a particularly preferred embodiment of the polymer is that in which c+d>0, in particular d>0. In particular, —NH—CH$_2$—CH$_2$—OH has proven to be particularly advantageous as radical R$^3$. Such polymers A have a chemically bonded ethanolamine which can be eliminated. The ethanolamine is an extremely efficient corrosion inhibitor. As a result of the chemical bonding of the corrosion inhibitor, the odor is greatly reduced in comparison to where it is merely admixed. Furthermore, it was found that such polymers A also have significantly stronger plasticizing properties.

The composition according to the invention is preferably a solution, a dispersion or a powder. In a further embodiment, the composition according to the invention may contain further additives, preferably an organic solvent or water. The composition according to the invention is preferably an aqueous dispersion or a solution, in particular an aqueous solution.

Particularly suitable organic solvents are alcohols, preferably methanol, ethanol, propanol, isopropanol, butanol, higher alcohols, such as ethylene glycol, glycerol, polyetherpolyols such as polyethylene glycols, and ether alcohols, such as butyl glycol, methoxypropanol, and alkylpolyethylene glycols, but also aldehydes, esters, ethers, amides or ketones, in particular acetone, methyl ethyl ketone, hydrocarbons, in particular methyl esters, ethyl esters, isopropyl esters, heptane, cyclohexane, xylene, toluene, white spirit and mixtures thereof. Ethyl acetate, ethanol, isopropanol or heptane and mixtures thereof are preferred.

Water is particularly preferred as a further additive. Mixtures of water with alcohols having a water content of more than 50% by weight, preferably more than 65% by weight, in particular more than 80% by weight, based on the total weight of water and organic solvent, are furthermore preferred.

Examples of further additives are additives that are familiar in concrete technology, in particular surface-active substances, heat and light stabilizers, release agents, chromate reducers, dyes, antifoams, accelerators, retardants, further corrosion inhibitors, air-introducing and deaerating substances, pore formers, pumping auxiliaries, viscosity regulators, water repellents or thixotropic agents or shrinkage reducers.

The proportion of the polyalkylene glycol is typically from 1 to 70% by weight, preferably from 10 to 50% by weight, particularly preferably from 15 to 45% by weight, more preferably from 15 to 40% by weight, particularly preferably from 25 to 40% by weight, based on the total dry weight of the composition. Total dry weight is understood as meaning the weight of the composition without water or solvent.

The proportion of the plasticizer, in particular the proportion of the polymer A, is typically from 30 to 99% by weight, preferably from 50 to 95% by weight, more preferably from 55 to 85% by weight, even more preferably from 60 to 85% by weight, particularly preferably from 60 to 75% by weight, based on the total dry weight of the composition.

In a particularly preferred embodiment, the composition according to the invention comprises at least one polyethylene glycol (PEG) or one methoxypolyethylene glycol (MPEG) having a molecular weight of from 4000 to 6000 g/mol and at least one polymer of the formula (II) where c+d>0, preferably d>0, and where R$^1$ is -[AO]$_n$—R$^4$, i.e. a polyalkylene glycol radical in which A is a C$_2$- and/or C$_3$-alkylene group and AO is thus an ethylene oxide (EO) and/or propylene oxide (PO) unit and the value for n is chosen so that the molecular weight for R$^1$ is not substantially higher than 3000 g/mol, preferably M$_w$ is from 1000 to 3000 g/mol. Thus, the ratio of the average molecular weight between the free polyalkylene glycol of the formula (I) and the polyalkylene glycol radical R$^1$ in the polymer A is more than 1.2, in particular more than 1.3. Preferably, the proportion of the polyalkylene glycol is from 15 to 45% by weight, in particular from 25 to 40% by weight, based on the total dry weight of the composition, and the weight-ratio between the polyalkylene glycol of the formula (I) and the plasticizer, in particular the polymer of the formula (II), is from 0.17 to 0.7, preferably from 0.33 to 0.7.

A pulverulent composition according to the invention without water or organic solvent is also preferred.

In a further aspect, the present invention relates to a hydraulically setting composition which contains the composition according to the invention and furthermore at least one hydraulically setting binder or consists thereof. The hydraulically setting binder is preferably a mineral binder, such as, for example, cement, gypsum, flyash, silica fume, slag, slag sands, limestone filler or quick lime. Preferred hydraulic binders comprise at least one cement, in particular at least one cement according to European standard EN 197, or calcium sulfate, in the form of anhydrite, hemihydrate or dihydrate gypsum; or calcium hydroxide. Portland cements, sulfoaluminate cements and high-alumina cements, in particular Portland cement, are preferred. Mixtures of cements can lead to particularly good properties. For rapid hardening, in particular cement-containing fast-acting binders are used, which preferably contain at least one high-alumina cement or another aluminate source, such as, for example, aluminate-donating clinker, and optionally calcium sulfate, in the form of anhydrite, hemihydrate or dihydrate gypsum; and/or calcium hydroxide. Cement, in particular Portland cement, is preferred as constituent of the hydraulic binder. A low-chromate cement is particularly preferred. The hydraulically setting composition is preferably concrete.

The composition according to the invention is preferably metered into the hydraulically setting binder so that the proportion of the composition according to the invention is from 0.05 to 3% by weight, preferably from 0.1 to 1.5% by weight, particularly preferably from 0.2 to 1% by weight, based on the weight of the hydraulically setting binder.

The preparation of the composition according to the invention is effected by mixing the polyalkylene glycol of the formula (I) with at least one plasticizer comprising or consisting of at least one polymer A of the formula (II), with the question of whether first the polyalkylene glycol or first the plasticizer is present in the sequence playing no role. The preparation of an aqueous composition is effected by addition of water during the preparation of the plasticizer, in particular during the preparation of the polymer A of the formula (I), or by subsequent mixing of the plasticizer and of the polyalkylene glycol with water. The composition according to the invention may be present as powder, clear or opaque solution or as dispersion, i.e. as emulsion or suspension.

For the processing of the dry hydraulically setting composition, a required amount of water is added and the mixture is processed. The amount of water required depends primarily on the water/cement ratio (w/c value) usually used by the person skilled in the art. The plasticizer or the polyalkylene glycol can be added simultaneously or in succession in any desired sequence to the hydraulically setting composition, preferably the dry concrete mix, before addition of the mixing water, simultaneously with the mixing water or after addition of the mixing water, or first the plasticizer and the mixing water and then the polyalkylene glycol can be added to the hydraulically setting composition. After contact with the water, the hydraulically setting composition hardens.

In a further aspect, the present invention therefore relates to a hydraulic composition hardened with water, preferably concrete which comprises the composition according to the invention.

In a further aspect, the present invention relates to the use of the composition according to the invention for extending the processing time and for improving the flow properties of hydraulically setting compositions compared with hydraulically setting compositions comprising conventional plasticizers. In particular, the setting time of the hydraulically setting compositions comprising a composition according to the invention is not extended compared with hydraulically setting compositions comprising conventional retardants.

The "processing time" or "time of processability" is designated as the time during which a hydraulically setting composition, preferably fresh concrete, is processable. The "processability" designates the behavior of the hydraulically setting composition, preferably of the fresh concrete, during mixing, transport, delivery and introduction at the installation site and subsequently during compaction and processing of the surface. The processability can be described in measurable terms with the consistency in numbers. For example, the consistency can be determined by testing the slump, the degree of compactibility, the flow or the air void content. In the case of fresh concrete, test methods according to the standard EN 12350 are preferably carried out.

In a preferred embodiment, the processing time is extended by more than 10%, preferably by 20 to 70%, more preferably by 25 to 50%, compared with the corresponding processing time of customary hydraulically setting compositions comprising a conventional plasticizer without a polyalkylene glycol of the formula (I).

The present invention furthermore relates to a concrete construction which comprises at least one composition according to the invention. The concrete construction is advantageously a structure of building construction or civil engineering, in particular a building or tunnel, a road or a bridge.

The present composition according to the invention has the advantage that it simultaneously acts as a plasticizer and as a processability extender for a hydraulically setting composition. The effect of the plasticizer is even additionally improved by addition of the polyalkylene glycol. This is extremely surprising because the polyalkylene glycol alone has no plasticizing effect in a hydraulically setting composition.

EXAMPLES

The invention is explained in more detail with reference to examples.

1.1 Raw Materials Used

TABLE 1

Raw materials used.

| Abbreviation | Manufacturer | Meaning | Mw* |
|---|---|---|---|
| PEG200 | Fluka, Switzerland | Polyethylene glycol 200 | 200 g/mol |
| PEG5000 | Fluka, Switzerland | Polyethylene glycol 5000 | 5000 g/mol |
| PEG6000 | Fluka, Switzerland | Polyethylene glycol 6000 | 6000 g/mol |
| MPEG3000 | Fluka, Switzerland | Methoxypolyethylene glycol 3000 | 3000 g/mol |
| MPEG5000 | Fluka, Switzerland | Methoxypolyethylene glycol 5000 | 5000 g/mol |
| PPG2000 | Fluka, Switzerland | Polypropylene glycol 2000 | 2000 g/mol |
| Jeffamin ® D400 | Huntsman | O,O'-Bis-(2-aminopropyl)-PPG300 | 400 g/mol |
| Sodium gluconate | Fluka, Switzerland | D-Gluconic acid sodium salt | |

*Mw = average molecular weight 1.2 Polymers A Used

TABLE 2

Abbreviations used.

| Abbreviation | Meaning | Mw* |
|---|---|---|
| PEG1000 | Polyethylene glycol without terminal OH groups | 1000 g/mol |
| PEG3000 | Polyethylene glycol without terminal OH groups | 3000 g/mol |
| EO/PO(50/50)2000 | Block copolymer of ethylene oxide and propylene oxide in the ratio of 50:50 without terminal OH groups | 2000 g/mol |

*Mw = average molecular weight

The polymers A stated in Table 3 were prepared by means of polymer-analogous reaction of poly(meth)acrylic acid with the corresponding alcohols and amines in a known manner. The polymer A-1 is present in a form partly neutralized by NaOH (M=H$^+$, Na$^+$).

The polymers A are used as aqueous solution in these examples. The content of polymer (A-1, A-2, and A-3) is 40% by weight. These aqueous solutions are referred to as A-1L, A-2L and A-3L. The concentrations of A stated in the following tables are based in each case on the content of polymer A.

TABLE 3

Polymer A corresponds to the formula (II) where M = H⁺, Na⁺.

|  | A-1 | A-2 | A-3 |
|---|---|---|---|
| R = | H | $CH_3$ | $CH_3$ |
| $R^1$ = | -PEG1000-$OCH_3$: 57.2: -PEG3000-$OCH_3$ 42.8† | -PEG1000-$OCH_3$: 45.5: -PEG3000-$OCH_3$ 54.5† | -PEG1000-$OCH_3$ |
| $R^2$ = | EO/PO(50/50)2000-$OCH_3$ | EO/PO(50/50)2000-$OCH_3$ | EO/PO(50/50)2000-$OCH_3$ |
| $R^3$ = |  |  |  |
| a/b/c/d = | 0.640/0.358/0.002/0.000 | 0.745/0.253/0.002/0.000 | 0.638/0.360/0.002/0.000 |
| Mw | 72 000 | 60 000 | 35 000 |

†Molar ratio

2.1 Flow Behavior of Mortar

A mortar with a particle size of 0-8 mm, with about 320 kg/m³ of Portland cement CEM I 42.5, and a w/c value of 0.4 was prepared. On addition of the mixing water, 0.32% of the polymers A stated in Table 4 and a polyalkylene glycol in the amount stated in Table 4 were simultaneously added. The stated percentages relate in each case to the dry weight of the polymers A or of the polyalkylene glycols, based on the cement. The polymers A and the polyalkylene glycols were dissolved in water before the addition and, unless stated otherwise, were added at 40% strength solution with the mixing water to the dry mortar mix.

For investigating the flow behavior, the slump (SLU) in millimeters was measured both according to DIN 18555 with impacts (wI) and without impacts (woI) only after removal of the cone, at different times. In addition, the air void content (air) was determined according to EN 196.

having a $M_w$ of 200 g/mol is taken as the polyalkylene glycol, the mortar is no longer readily processable after 60 minutes. On the other hand, outstanding results are obtained with polyalkylene glycols having a molecular weight $M_w$ of from 4000 to 6000 g/mol, in particular with PEG5000, PEG6000 and MPEG5000, very particularly with MPEG5000. Particularly good results were obtained with polyalkylene glycol used in an amount of from 15 to 45% by weight, in particular in an amount of from 25 to 40% by weight, based on the total dry weight of the polyalkylene glycol and the plasticizer or polymer A.

2.2 Flow Behavior of Concrete

A concrete with a particle size of 0-32 mm, with about 320 kg/m³ of Portland cement CEM I 42.5 and with a w/c value of 0.43 was prepared. On addition of the mixing water, a polymer A and a polyalkylene glycol in the amounts stated in Tables 5 and 6 were simultaneously added. The stated per-

TABLE 4

| No. | Polymer A | Polyalkylene glycol | SLU 0 min woI | SLU 0 min wI | SLU 30 min woI | SLU 30 min wI | SLU 40 min woI | SLU 40 min wI | SLU 60 min woI | SLU 60 min wI | Air 0 min |
|---|---|---|---|---|---|---|---|---|---|---|---|
| 1 | A-1 | — | 175 | 220 | 129 | 180 | 115 | 170 | 100 | 139 | 2.3 |
| 2 | A-1 | 0.03% PEG200 | 180 | 223 | 125 | 175 | n.d. | n.d. | 102 | 132 | 3.2 |
| 3 | A-1 | 0.16% PEG200 | 182 | 230 | 119 | 166 | n.d. | n.d. | 100 | 125 | 2.6 |
| 4 | A-1 | 0.25% PEG200 | 168 | 220 | 117 | 170 | n.d. | n.d. | 100 | 130 | 2.8 |
| 5 | A-1 | 0.03% MPEG3000 | 172 | 225 | 130 | 178 | n.d. | n.d. | 105 | 140 | 4.3 |
| 6 | A-1 | 0.16% MPEG3000 | 177 | 229 | 147 | 188 | n.d. | n.d. | 110 | 155 | 3.3 |
| 7 | A-1 | 0.25% MPEG3000 | 182 | 230 | 154 | 195 | n.d. | n.d. | 110 | 159 | 3.1 |
| 8 | A-1 | 0.03% MPEG5000 | 177 | 228 | 148 | 190 | n.d. | n.d. | 110 | 155 | 2.8 |
| 9 | A-1 | 0.16% MPEG5000 | 180 | 225 | 155 | 195 | n.d. | n.d. | 110 | 160 | 2.8 |
| 10 | A-1 | 0.2% MPEG 5000 | 180 | 225 | n.d. | n.d. | 160 | 200 | 110 | 170 | n.d. |
| 11 | A-1 | 0.25% MPEG5000 | 180 | 230 | 160 | 205 | n.d. | n.d. | 110 | 167 | 2.8 |
| 12 | A-1 | 0.03% Jeffamin ®D400 | 172 | 228 | 128 | 178 | n.d. | n.d. | 110 | 140 | 2.5 |
| 13 | A-1 | 0.16% Jeffamin ®D400 | 177 | 224 | 137 | 184 | n.d. | n.d. | 105 | 147 | 2.5 |
| 14 | A-1 | 0.25% Jeffamin ®D400 | 180 | 226 | 145 | 190 | n.d. | n.d. | 108 | 151 | 2.8 |
| 15 | A-1 | 0.03% PPG2000 | 180 | 235 | 131 | 183 | n.d. | n.d. | 107 | 147 | 1.5 |
| 16 | A-1 | 0.16% PPG2000 | 182 | 235 | 137 | 185 | n.d. | n.d. | 107 | 151 | 1.6 |
| 17 | A-1 | 0.25% PPG2000 | 191 | 238 | 142 | 187 | n.d. | n.d. | 104 | 155 | 1.3 |
| 18 | A-1 | 0.03% PEG5000 | 177 | 228 | 148 | 189 | n.d. | n.d. | 110 | 153 | 2.7 |
| 19 | A-1 | 0.16% PEG5000 | 181 | 225 | 158 | 197 | n.d. | n.d. | 110 | 160 | 2.8 |
| 20 | A-1 | 0.25% PEG5000 | 183 | 227 | 163 | 200 | n.d. | n.d. | 111 | 170 | 3 |
| 21 | A-1 | 0.2% PEG6000 | 180 | 225 | n.d. | n.d. | 140 | 200 | 105 | 165 | n.d. |

Slump (SLU) in mm;
min = minutes,
n.d. = not determined;
woI = without impacts;
wI = with impacts;
air = air void content;
* = 30% strength solution Table 4 shows that the processability of the mortar which contains a polyalkylene glycol according to the invention is still very good even after 60 minutes. The mortar is considered to be readily processable if the values of the slump are above 130 mm in the tests with impacts (wI). If the PEG200 centages relate in each case to the dry weight of the polymers A or of the polyalkylene glycols, based on the cement. The polymers A and the polyalkylene glycols were dissolved in water before the addition and added as 40% strength solution with the mixing water to the concrete mix.

For investigating the flow behavior, the slump (SLU) in centimeters was measured according to EN 12350 at different times. In addition, the air void content (air) was determined according to EN 12350 and the compressive strength according to EN 12390 (cf. Tables 5 and 6).

TABLE 5

| No. | Polymer A | Polyalkylene glycol | SLU 0 min | SLU 30 min | SLU 60 min | Air 0 min | Compressive strength [N/mm$^2$] after 1 d at 10° C. | at 20° C. |
|---|---|---|---|---|---|---|---|---|
| 22 | 0.16% A-1 | — | 55 | 42 | 33 | 1.3 | 18.4 | 27.7 |
| 23 | 0.16% A-1 | 0.048% MPEG5000 | 51 | 49 | 41 | 1.3 | 17 | 27.3 |

Slump (SLU) in cm;
min = minutes;
air = air void content in %;
d = day

Table 5 shows that the processability of the concrete which contains a polyalkylene glycol according to the invention is still very good even after 60 minutes, compared with the concrete which contains only a plasticizer. The limit of processability in the case of this concrete is at a slump of about 30 cm. Without polyalkylene glycol, the concrete is only just processable after 60 minutes, whereas the concrete comprising MPEG5000 is still readily processable after 60 minutes. In addition, the compressive strength after one day at 10° C. shows that the concrete does not lose any strength as a result of the addition of polyalkylene glycol.

TABLE 6

| No. | Polymer A | Polyalkylene glycol | SLU 0 h | SLU 1 h | SLU 3 h | SLU 4 h | SLU 6 h | Air 0 h |
|---|---|---|---|---|---|---|---|---|
| 24 | 0.48% A-3 | — | 65 | 58 | 48 | 38 | n.d. | 1.7 |
| 25 | 0.48% A-3 | 0.08% MPEG3000 | 64 | 59 | 54 | n.d. | n.d. | 1.2 |
| 26 | 0.48% A-3 | 0.2% MPEG3000 | 65 | 60 | 57 | n.d. | n.d. | 2.6 |
| 27 | 0.48% A-3 | 0.08% MPEG5000 | 66 | 62 | 58 | n.d. | n.d. | 2.6 |
| 28 | 0.48% A-3 | 0.2% MPEG5000 | 65 | 63 | 60 | 50 | 38 | 2.4 |

Slump (SLU) in cm;
h = hour;
air = air void content in %;
n.d. = not determined

Table 6 shows that the processability of the concrete which contains a polyalkylene glycol according to the invention is still very good even after 3 hours, compared with the concrete which contains only a plasticizer. The limit of processability is reached when the slump of the concrete of this composition falls below 40 cm. In the case of the concrete without polyalkylene glycol, this value is reached after about 4 hours; in the case of the concrete comprising polyalkylene glycol, it is reached only after about 6 hours. Outstanding results were obtained with MPEG5000. It is thus showed here that the processing time of a concrete to which a composition comprising a plasticizer with polymer A and a polyalkylene glycol was added during the preparation is extended by about 50%, compared with a concrete to which only a plasticizer with polymer A was added during the preparation.

3. Comparison of the Setting Times

A concrete with a particle size of 0-32 mm, with about 320 kg/m$^3$ of Portland cement CEM I 42.5 and with a w/c value of 0.43 was prepared. On addition of the mixing water, a polymer A and a polyalkylene glycol or a sodium gluconate in the amount stated in Table 7 were simultaneously added. The stated percentages relate in each case to the dry weight of the polymers A or of the polyalkylene glycol or of the sodium gluconate, based on the cement. The polymers A and the polyalkylene glycol or the sodium gluconate were dissolved in water before the addition and added as 40% strength solution with the mixing water to the concrete mix.

The setting times were measured by determining the maximum temperature ($T_{max}$) of the concrete mixes. Setting times of the concrete mixes comprising the composition according to the invention were compared with the setting times of concrete mixes comprising conventional retardants, such as sodium gluconate or starch derivatives. Table 7 shows that the setting times of the concrete mixes comprising conventional retardants are extended compared with concrete mixes only comprising plasticizer, or the setting times of concrete mixes comprising plasticizers and polyalkylene glycols are comparable with those without polyalkylene glycol.

TABLE 7

Setting times in hours (h)

| No. | Polymer A | Polyalkylene glycol or retardant | Setting time ($T_{max}$) |
|---|---|---|---|
| 29 | 0.4% A-3 | — | 16 h |
| 30 | 0.4% A-3 | 0.2% MPEG5000 | 16 h |
| 31 | 0.4% A-3 | 0.05% Sodium gluconate | 18 h |
| 32 | 0.4% A-3 | 0.1% Sodium gluconate | 21 h |

Of course, the invention is not limited to the working examples shown and described. The abovementioned features of the invention can of course be used not only in the combination stated in each case but also in other modifications, and combinations and with other changes or in isolation, without departing from the scope of the invention.

The invention claimed is:
1. A composition comprising:
(a) at least one substituted or unsubstituted polyalkylene glycol of the formula (I):

$$R^{11}-O-(R^{12}-O)_x-(R^{13}-O)_y-R^{14} \quad (I)$$

in which:
$R^{11}$ is H or $C_1$- to $C_{20}$-alkyl,
$R^{12}$ is $C_2$- to $C_4$-alkylene,
$R^{13}$ is $C_2$- to $C_4$-alkylene,
$R^{14}$ is H or $C_1$- to $C_{20}$-alkyl,
x is 0-500,
y is 0-500, and
x+y is >20; and
(b) at least one plasticizer for a hydraulically setting composition, the plasticizer comprising at least one polymer A of formula (II):

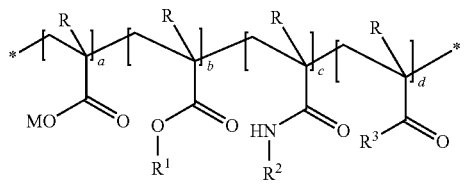

in which:
M, independently of one another, is $H^+$, alkali metal ion, alkaline earth metal ion, divalent or trivalent metal ion, ammonium ion or organic ammonium group,
R, each R independently of the other, is hydrogen or methyl,
$R^1$ is -$[AO]_n$-$R^4$, where n is selected so that a molecular weight of $R^1$ is not greater than 3000 g/mol, A is $C_2$- to $C_4$-alkylene, and $R^4$ is $C_1$- to $C_{20}$-alkyl, cyclohexyl or alkylaryl,
$R^2$ is $C_1$- to $C_{20}$-alkyl, cycloalkyl, alkylaryl or -$[AO]_n$-$R^4$, in which:
A is $C_2$- to $C_4$-alkylene,
$R^4$ is $C_1$- to $C_{20}$-alkyl, cyclohexyl or alkylaryl, and
n is 2-250,
$R^3$ is $-NH_2$, $-NR^5R^6$, $-OR^7NR^8R^9$, in which
$R^5$ and $R^6$, independently of one another, are: H or a $C_1$- to $C_{20}$-alkyl, cycloalkyl or alkylaryl or aryl group; or is a hydroxyalkyl group, or is an acetoxyethyl ($CH_3-CO-O-CH_2-CH_2-$) or a hydroxyisopropyl ($HO-CH(CH_3)-CH_2-$) or an acetoxyisopropyl group ($CH_3-CO-O-CH(CH_3)-CH_2-$), or
$R^5$ and $R^6$ together form a ring, of which the nitrogen of the $-NR^5R^6$ is a part in order to build up a morpholine or imidazoline ring, in which $R^7$ is a $C_2$-$C_4$-alkylene group, and $R^8$ and $R^9$, independently of one another, are a $C_1$- to $C_{20}$-alkyl, cycloalkyl, alkylaryl, aryl or hydroxyalkyl group,
a, b, c and d are molar ratios,
a/b/c/d is (0.05-0.9)/(0.05-0.95)/(0-0.8)/(0-0.5), and
a+b+c+d=1;
wherein:
a proportion of the polyalkylene glycol is from 1 to 45% by weight based on a total dry weight of the composition;
a proportion of the at least one plasticizer is from 50 to 95% by weight based on the total dry weight of the composition; and
a molecular weight $M_w$ of the polyalkylene glycol is from 4,000 to 20,000 g/mol.

2. The composition as claimed in claim 1, wherein n for $R^1$ is from 15 to 80.

3. The composition as claimed in claim 1, wherein a/b/c/d=(0.1-0.9)/(0.1-0.9)/(0-0.5)/(0-0.1).

4. The composition as claimed in claim 3, wherein c+d is >0.

5. The composition as claimed in claim 1, wherein, in the formula (I), $R^{12}$ is $R^{13}$.

6. The composition as claimed in claim 1, wherein the polyalkylene glycol of the formula (I) is a polyethylene glycol (PEG), methoxypolyethylene glycol (MPEG) or a polypropylene glycol (PPG).

7. The composition as claimed in claim 1, wherein the molecular weight $M_w$ of the polyalkylene glycol is from 4000 to 6000 g/mol.

8. The composition as claimed in claim 1, wherein the composition is a dispersion, a solution or a powder.

9. The composition as claimed in claim 1, wherein the composition is an aqueous solution.

10. The composition as claimed in claim 1, wherein the composition additionally contains an organic solvent or water.

11. The composition as claimed in claim 1, wherein the proportion of the polyalkylene glycol is from 15 to 45% by weight based on the total dry weight of the composition.

12. The composition as claimed in claim 1, wherein the proportion of the at least one plasticizer is from 55 to 85% by weight based on the total dry weight of the composition.

13. A hydraulically setting composition comprising the composition as claimed in claim 1, and at least one hydraulically setting binder.

14. A hydraulic composition hardened with water and comprising a composition as claimed in claim 1.

15. A method for extending a processing time of a hydraulically setting composition, comprising adding to the hydraulically setting composition a composition comprising:
(a) at least one substituted or unsubstituted polyalkylene glycol of the formula (I):

$$R^{11}-O-(R^{12}-O)_x-(R^{13}-O)_y-R^{14} \quad (I)$$

in which:
$R^{11}$ is H or $C_1$- to $C_{20}$-alkyl,
$R^{12}$ is $C_2$- to $C_4$-alkylene,
$R^{13}$ is $C_2$- to $C_4$-alkylene,
$R^{14}$ is H or $C_1$- to $C_{20}$-alkyl,
x is 0-500,
y is 0-500,
x+y is >20; and
a molecular weight $M_w$ of the polyalkylene glycol of formula (I) is from 2000 to 20000 g/mol; and
(b) at least one plasticizer for a hydraulically setting composition, the plasticizer comprising at least one polymer A of formula (II):

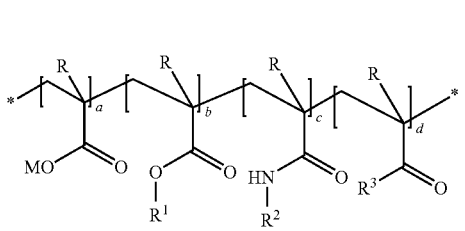

(II)

in which:
- M, independently of one another, is $H^+$, alkali metal ion, alkaline earth metal ion, divalent or trivalent metal ion, ammonium ion or organic ammonium group,
- R, each R independently of the other, is hydrogen or methyl,
- $R^1$ and $R^2$, independently of one another, are $C_1$- to $C_{20}$-alkyl, cycloalkyl, alkylaryl or $-[AO]_n-R^4$, in which:
  - A is $C_2$- to $C_4$-alkylene,
  - $R^4$ is $C_1$- to $C_{20}$-alkyl, cyclohexyl or alkylaryl, and
  - n is 2-250,
- $R^3$ is $-NH_2$, $-NR^5R^6$, $-OR^7NR^8R^9$, in which
  - $R^5$ and $R^6$, independently of one another, are: H or a $C_1$- to $C_{20}$-alkyl, cycloalkyl or alkylaryl or aryl group; or is a hydroxyalkyl group, or is an acetoxyethyl ($CH_3-CO-O-CH_2-CH_2-$) or a hydroxyisopropyl ($HO-CH(CH_3)-CH_2-$) or an acetoxyisopropyl group ($CH_3-CO-O-CH(CH_3)-CH_2-$), or
  - $R^5$ and $R^6$ together form a ring, of which the nitrogen of the $-NR^5R^6$ is a part in order to build up a morpholine or imidazoline ring, in which $R^7$ is a $C_2$-$C_4$-alkylene group, and $R^8$ and $R^9$, independently of one another, are a $C_1$- to $C_{20}$-alkyl, cycloalkyl, alkylaryl, aryl or hydroxyalkyl group,
- a, b, c and d are molar ratios,
- a/b/c/d is (0.05-0.9)/(0.05-0.95)/(0-0.8)/(0-0.5), and
- a+b+c+d=1.

16. The method according to claim 15, wherein the processing time is extended by more than 10% compared with a processing time of hydraulically setting compositions comprising a plasticizer without a polyalkylene glycol of formula (I).

17. A process for preparing the composition as claimed in claim 1, comprising:
mixing the polyalkylene glycol of formula (I) with the at least one plasticizer comprising the at least one polymer A of formula (II).

18. A concrete construction comprising the composition as claimed in claim 1.

19. The concrete construction as claimed in claim 18, wherein the concrete construction is a structure of building construction or civil engineering.

* * * * *